(12) United States Patent
Kiest, Jr.

(10) Patent No.: US 9,683,692 B2
(45) Date of Patent: Jun. 20, 2017

(54) MAIN / LATERAL CONNECTION LINER WITH RESIN PUTTY MAINLINE PORTION

(71) Applicant: LMK TECHNOLOGIES LLC, Ottawa, IL (US)

(72) Inventor: Larry W. Kiest, Jr., Ottawa, IL (US)

(73) Assignee: LMK Technologies LLC, Ottawa, IL (US)

( * ) Notice: Subject to any disclaimer, the term of this patent is extended or adjusted under 35 U.S.C. 154(b) by 360 days.

(21) Appl. No.: 13/710,680

(22) Filed: Dec. 11, 2012

(65) Prior Publication Data

US 2014/0158243 A1    Jun. 12, 2014

(51) Int. Cl.
| | |
|---|---|
| *F16L 55/18* | (2006.01) |
| *F16L 55/26* | (2006.01) |
| *F16L 55/179* | (2006.01) |

(52) U.S. Cl.
CPC ........... *F16L 55/265* (2013.01); *F16L 55/179* (2013.01)

(58) Field of Classification Search
CPC . F16L 55/163; F16L 55/1651; F16L 55/1656; F16L 55/179; B29C 63/36; E03F 2003/065
USPC ............ 137/15.08–15.13, 15.15; 138/97, 98; 405/184.1, 184.2; 156/287, 380.9
See application file for complete search history.

(56) References Cited

U.S. PATENT DOCUMENTS

| | | | | |
|---|---|---|---|---|
| 3,767,503 | A | * | 10/1973 | Maddalena ............... 156/244.22 |
| 4,096,108 | A | * | 6/1978 | Webb et al. .................. 523/159 |
| 5,169,723 | A | * | 12/1992 | Forster ...................... C23F 1/28 427/142 |
| 5,609,439 | A | * | 3/1997 | Schreiner et al. ......... 405/184.2 |
| 5,915,419 | A | * | 6/1999 | Tweedie et al. ................. 138/98 |
| 5,927,341 | A | * | 7/1999 | Taylor ............................. 138/98 |
| 2009/0056823 | A1 | * | 3/2009 | Kiest, Jr. ............. F16L 55/1651 138/98 |
| 2009/0194184 | A1 | * | 8/2009 | Kiest, Jr. ............... F16L 55/163 138/98 |
| 2013/0213262 | A1 | * | 8/2013 | Merrifield ............. C09J 167/00 106/266 |
| 2014/0158243 | A1 | * | 6/2014 | Kiest, Jr. ............... F16L 55/265 138/97 |

FOREIGN PATENT DOCUMENTS

| | | | | |
|---|---|---|---|---|
| JP | 2006219624 | A | * | 8/2006 |
| SU | 994583 | A | * | 5/1980 |

* cited by examiner

*Primary Examiner* — Frederick C Nicolas
*Assistant Examiner* — Bob Zadeh
(74) *Attorney, Agent, or Firm* — Nyemaster Goode, P.C.

(57) ABSTRACT

An apparatus for repairing a junction between a main sewer pipe and a lateral sewer pipe comprises a tubular portion having opposite first and second ends. A collar extends outwardly from one of the first and second ends of the tubular portion. The tubular portion and the collar are formed of a curable, waterproof putty, such as an epoxy or silicate putty. The putty may also be a resin, such as a thermoset or other curable resin. The apparatus is positioned at the pipe juncture to prevent the migration of water through a damaged section of the pipe.

16 Claims, 4 Drawing Sheets

MAIN / LATERAL CONNECTION LINER WITH RESIN PUTTY MAINLINE PORTION

BACKGROUND OF THE INVENTION

The present invention relates to an apparatus and method for repairing a pipe junction, such as an underground sewer pipe junction.

Over time, lateral and main pipe lines can be damaged by such factors as tree root penetration, ground shift, and the like. The junction between the lateral pipe line and the main pipe line is one of the weakest parts of the sewer system and is particularly problematic. Cracks and other structural damage around the pipe junction allow sediment and ground water to infiltrate the main pipe line.

Ground water infiltration can still be a problem after the pipe junction has been lined using a cured-in-place liner. Ground water can enter through the damaged portion of the pipe line and migrate between the liner and the pipe line to a point where it can enter the pipe line.

Previous art has relied on pre-formed collars or sleeves manufactured off-site. These pre-formed devices are manufactured to meet a variety of main pipe line and lateral pipe line junctions, e.g., T-Shaped or Y-Shaped. Each T-Shaped member must meet two dimensional specifications: (1) main pipe line diameter, and (2) lateral pipe line diameter. Each Y-Shaped member must meet three dimensional specifications: (1) main pipe line diameter, (2) lateral pipe line diameter, and (3) lateral pipe line oblique angle referenced to main pipe line. The many dimensional specification variables create a large number of devices, which must be warehoused to meet on-site demands.

There is therefore a need in the art for a device and method of renewing a pipeline junction on-site.

There is therefore a need in the art for a device and method of renewing a pipeline junction that seals the junction to prevent ground water infiltration and that also obviates the need for a liner.

It is therefore a primary object, feature, and/or advantage of the present invention to overcome deficiencies in the art.

Another object, feature, and/or advantage of the present invention is the provision of an improved apparatus and method for repairing a pipe junction.

A further object, feature, and/or advantage of the present invention is the provision of an apparatus and method for preventing ground water from infiltrating a pipe line near the juncture between a main pipe line and a lateral pipe line.

Yet another object, feature, and/or advantage of the present invention is the provision of an improved lining apparatus that can be formed in the field to adapt to different diameters of pipe.

These and/or other objects, features, and advantages of the present invention will be apparent to those skilled in the art. The present invention is not to be limited to or by these objects, features and advantages. No single embodiment need provide each and every object, feature, or advantage.

BRIEF SUMMARY OF THE INVENTION

An apparatus for repairing a junction between a main sewer pipe and a lateral sewer pipe, which comprises a tubular portion having opposite first and second ends, is provided. A collar extends outwardly from one of the first and second ends of the tubular portion. The tubular portion and the collar are formed of a soft, malleable, flexible, waterproof putty that cures to a rigid state and bonds to the pipes forming a water-tight seal.

An associated method for repairing the junction between a main sewer pipe and a lateral sewer pipe that obviates the need for a resin-impregnated liner is also provided. The method comprises forming a repair apparatus from a waterproof and curable putty. The repair apparatus includes a tubular portion having opposite first and second ends and a collar extending outwardly from one of the first and second ends of the tubular portion. A main bladder and a lateral bladder are provided, and the collar of the repair apparatus is positioned on the outside of the main bladder. The tubular portion of the repair apparatus is positioned on the inside of the lateral bladder. The repair apparatus, main bladder and the lateral bladder are moved along the main sewer pipe to an operative position with the tubular portion aligned with the junction between the main and lateral sewer pipes.

The lateral bladder with the tubular portion is moved into the lateral sewer pipe and inflated to press the tubular portion against the lateral sewer pipe, while the main bladder is inflated to press the collar against the main sewer pipe. The main bladder and the lateral bladder are then removed. The main and lateral bladders can be fluidly connected to inflate at the same time, or can be inflated by separate air sources. Furthermore, the lateral bladder and tubular portion can be inverted into the lateral pipe, pulled-in-place into the lateral pipe, or pushed-in-place into the lateral pipe.

A method of making an apparatus for repairing a junction between a main sewer pipe and a lateral sewer pipe is also provided. The method comprises providing a curable putty that can be soft, malleable, flexible, and waterproof. The curable putty is formed into a substantially flat sheet, and a collar is cut from the flat sheet. An aperture is formed in the collar. A tubular portion is formed by pressing outwardly around a periphery of the aperture in the collar.

DETAILED DESCRIPTION OF THE PREFERRED EMBODIMENT

There are several advantages to forming a repair apparatus in the field. For example, field personnel do not have to wait for the completed assembly to ship from an offsite factory. The repair apparatuses can be formed according to the specifications of the pipes being repaired quickly and easily. In addition, any anomalies associated with the main pipe/lateral pipe junctions are more efficiently and accurately handled onsite.

Figure 1A:
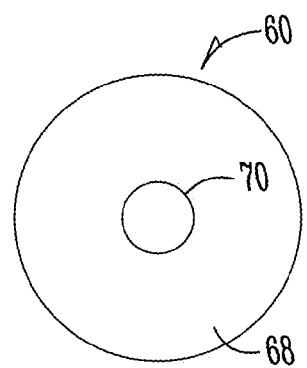
FIGS. 1A-F are top views showing various configurations of the repair apparatus according to the present invention.
Figure 1B:
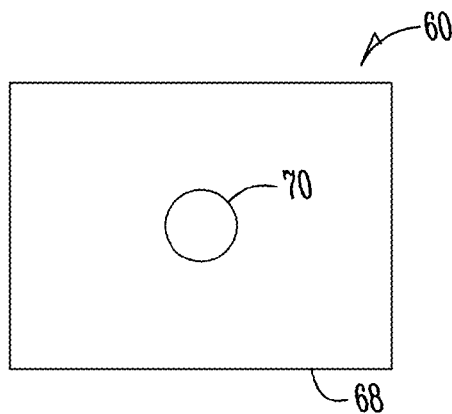
Figure 1C:
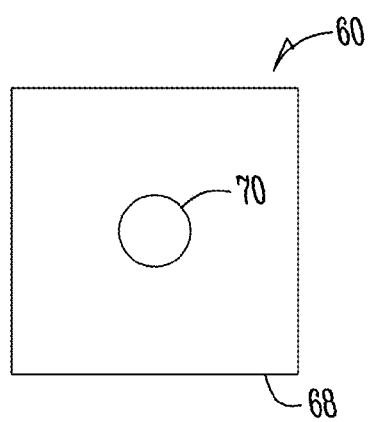
Figure 1D:
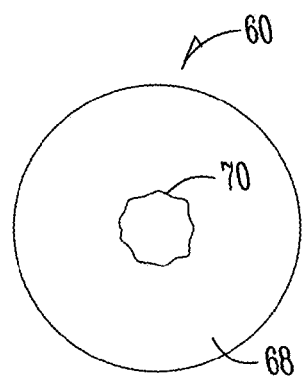
Figure 1E:
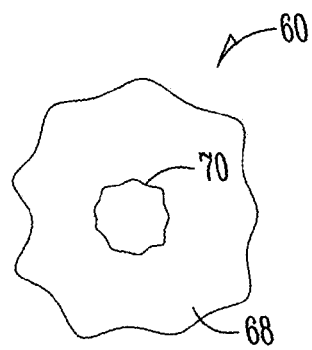

Therefore, the present invention includes the use of a repair apparatus 60 that can be prepared on-site. As shown in FIG. 1A, a repair apparatus 60 according to the invention can be made from a flat sheet that is shaped according to the requirements or preferences of the repair. An aperture 70 is formed in the sheet, with the area around the aperture 70 comprising a collar 68. The aperture 70 is sized such that the diameter of the aperture 70 is equal or smaller than the diameter of the lateral pipe. A tubular portion 66 is also formed, with the tube portion 66 including opposite first and second ends 62, 64. As shown best in FIGS. 3-6, the tubular portion 66 is connected at the aperture 70 of the collar 68 at either the first end 62 or the second end 64 of the tube 66. The tubular portion 66 can also be formed by pressing outwardly or inwardly around a periphery of the aperture 70 in the collar 68. In addition, the repair apparatus 60 can comprise multiple components combined together, or can comprise a unitary piece of material. For example, the tubular portion 66 could be a separate piece of the material that is fused, adhered, or otherwise attached to the collar 68.

The repair apparatus 60 comprises a waterproof and curable putty. Generally, an epoxy or silicate putty is a pliable substance used to create watertight seals in pipe defects. The repair apparatus 60 according to the present invention can be made of an epoxy or silicate putty that is soft, malleable, flexible, and curable, forming a watertight connection between a main and lateral pipe. A manufacturer of such material is Loctite® brand-consumer products, Henkel Corp, 26235 First Street, Westlake, Ohio 44145. However, it should be appreciated that other model numbers and manufacturers may be used to provide a putty or materials that have mastic properties that may be used as part of the present invention. The invention is not limited to the manufacturer or type of curable putty listed.

In addition, the curable putty can comprise a thermoset resin, which cures over time at ambient temperatures or when exposed to a heat source. For example, the thermoset resin may be configured to cure at approximately 150° F. The putty-thermoset resin combination can be formed into the repair apparatus 60, placed in a pipe, and then heat cured at the appropriate temperature or over time where the curing time can be adjusted to cure vary fast i.e., approximately 20-minutes, or slower, i.e., up to two hours. The addition of the heat source can affect the cure time of the putty or resin. The curing of the resin would solidify the resin, which would aid in maintaining the shape of the apparatus 60, thus repairing structural defects at the main/lateral connection and/or providing a watertight seal. Other types of epoxies and resins could also be used, such as UV-cured resins (ultraviolet-cured), two-part resins that cure when mixed, hydrophilic grouts, or hydrophobic resins or grouts. Abrasive materials, such as stones, metal shavings, or other materials may be added to the putty to further strengthen and add additional properties to the cured putty in the pipe. Furthermore, it is also contemplated that the curable putty comprise one or more of the resins, grouts, or epoxies that have been discussed, as well as additional components that may strengthen the repair apparatus 60 or add additional, desired properties.

Figure 1F:
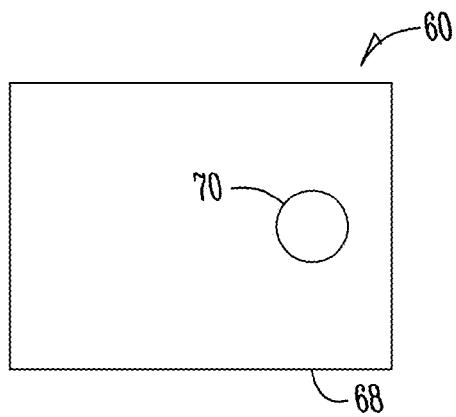

FIGS. 1B-1F are additional configurations for the repair apparatus 60, with the collars 68 and apertures 70 having various shapes and sizes. FIGS. 1B-E show the aperture to be centrally located. However, the aperture does not need to be a perfect circle, as shown in the embodiments depicted in FIGS. 1D-E. In addition, FIG. 1F shows that the aperture can be offset from center. As can be seen from FIGS. 1A-F, the repair apparatus 60 template can be extremely flexible. As such, the present invention contemplates generally any size, shape, and configuration for the repair apparatus 60, including the collar 68 and aperture 70. The method of installation will void any initial repair apparatus 60 manufacturer anomalies, as will be discussed later. Furthermore, the present invention contemplates that the tubular portion 66 need not be included in all configurations, and also that the portion 66 can comprise generally any shape that the aperture 70 may take.

Figure 2:
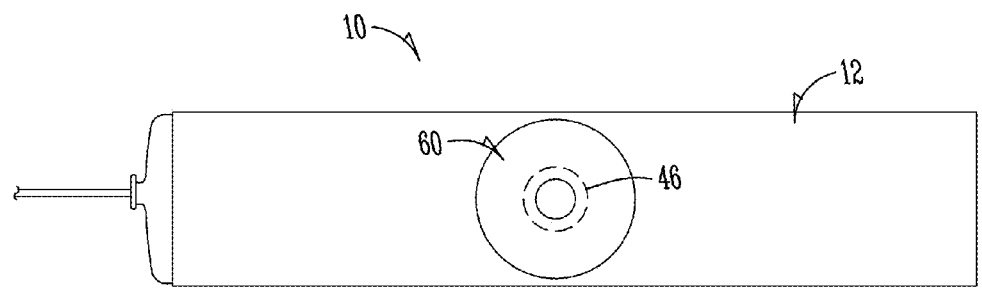
FIG. 2 is a top view of the repair apparatus placed on a launcher device.
Figure 3:
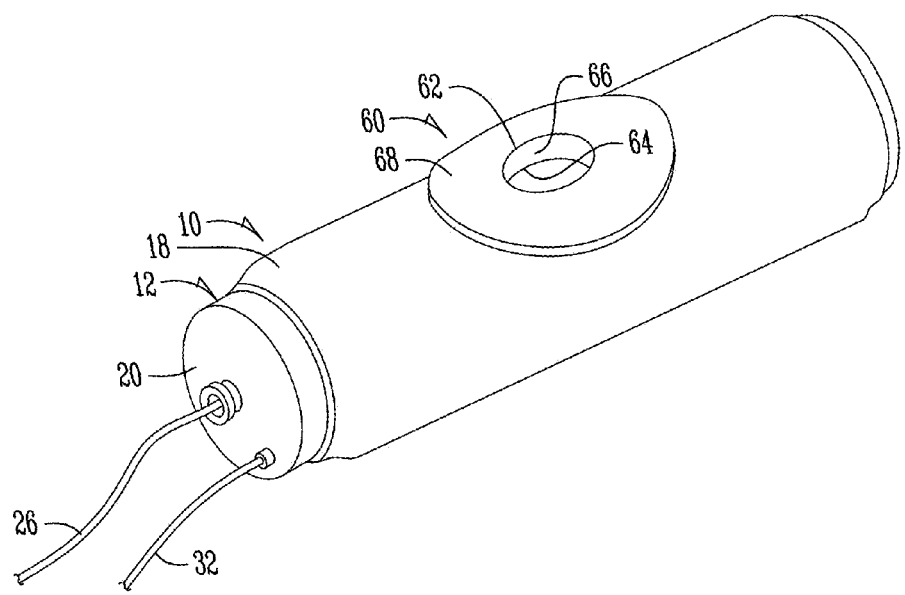
FIG. 3 is a perspective view of an embodiment of the present invention for reinstating lateral connections to a mainline pipe between access pipes.

Referring to FIG. 2, the repair assembly 10 in its preferred form includes a launcher device 12. Disposed and positioned on the top surface of the launcher device 12 is the repair apparatus 60. The repair apparatus 60 includes a collar portion 68 and a tubular portion 66 tucked into the launcher device opening 46 forming an inverted top hat, as can be best seen in FIG. 3. The tubular portion 66 includes opposite first and second ends 62, 64. The collar 68 is shown to extend from the first end 62 of the tubular portion 66, but it should be appreciated that the collar 68 could also extend from the second end 64. The tubular portion 66 shown in FIG. 3 is utilized for a T-shaped pipe juncture, but its shape can be modified as appropriate for use in a Y-shaped pipe junction. The collar portion 68 is adapted to fit adjacent a portion of the main pipe 50 and the tubular portion 66 is adapted to extend into the lateral pipe 52.

Figure 4:
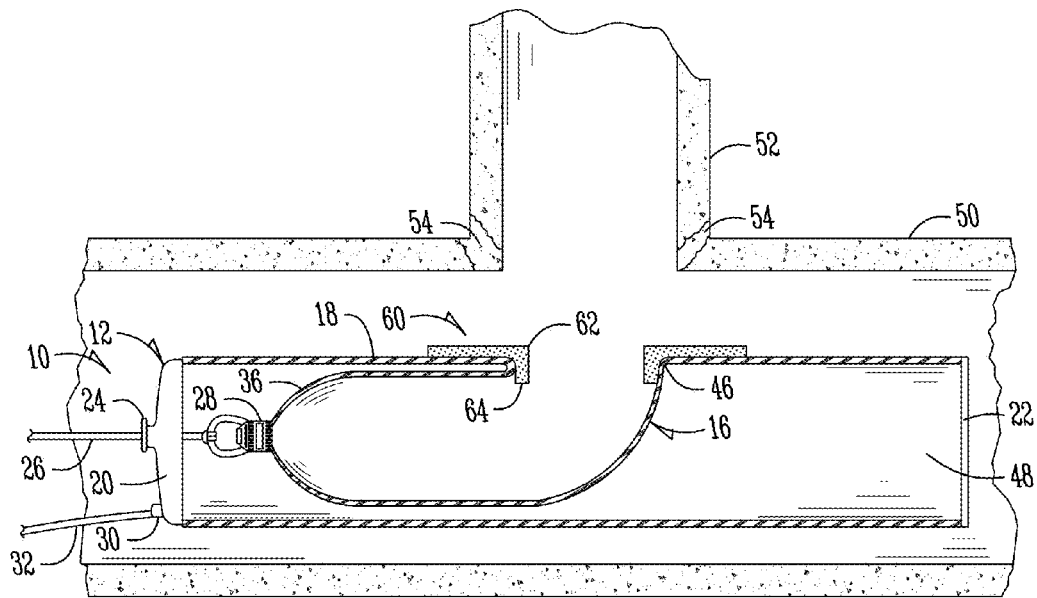
FIG. 4 is a sectional view showing a repair apparatus aligned with the junction between a main sewer pipe and a lateral sewer pipe.
Figure 5:
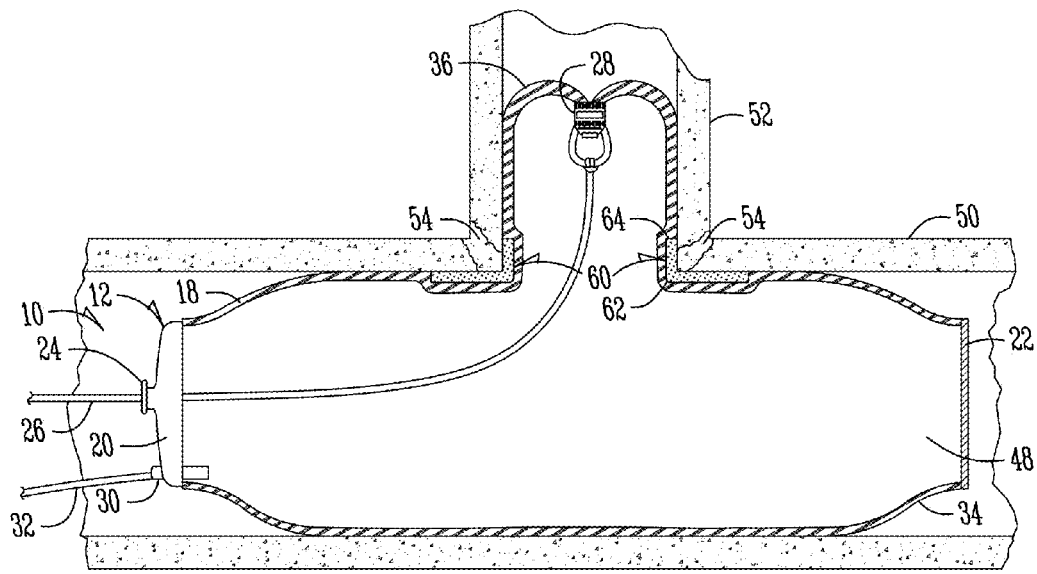
FIG. 5 is a sectional view showing a repair apparatus operatively placed between the junction between a main sewer pipe and a lateral sewer pipe.

During the installation process, the repair apparatus 60 is moved through the main pipe 50 using a launcher device 12 (see FIG. 3), which is placed in an operative position adjacent the junction between the lateral pipe 52 and main pipe 50. The repair apparatus 60 is affixed to the main pipe 50 by inflating a main bladder 34 to press the collar 68 against the main pipe, with the tubular portion 66 being folded back over itself (inverting) and extending into the lateral pipe 52 and being pressed against the lateral pipe by an inflating lateral bladder 36. The repair apparatus 60 is fixedly held in the proper position using the inflatable bladders until the putty is cured. Referring to FIGS. 4-5, repair assembly 10 includes a launcher device 12 having mounted thereto a repair apparatus 60. Repair assembly 10 also houses a T-shaped or Y-shaped bladder assembly 16. The bladder assembly 16 includes generally a main bladder portion 34 for expanding/inflating in the main pipe, and a lateral bladder portion 36 for extending into and expanding/inflating in the lateral pipe. In the particular configuration shown in FIGS. 4-5, the repair apparatus 60 and bladder assembly 16 are T-shaped, but they can also be Y-shaped to accommodate a lateral pipe line that intersects with a main pipe line at an oblique angle.

The launcher device 12 includes side walls 18, an end cap 20 and an end wall 22, all of which form a launcher device cavity 48. The end cap 20 includes a line inlet 24 through which a line 26 extends. The line 26 is attached to a closed bladder tube end 28. Also extending through end cap 20 is an air inlet 30, which is connected to an air hose 32. The bladder tube assembly 16 includes a main bladder tube 34 at least partially surrounding the side wall 18 of the launcher device 12, and a lateral bladder tube 36 extending from the main bladder tube 34.

FIG. 4 shows the repair assembly 10 moved within the main pipe line 50 adjacent the lateral pipe line 52. The launcher device opening 46 is aligned with the pipe junction. This alignment can be done with a camera within the lateral pipe (not shown). A camera can also be positioned forward or rearward of the launcher device 12, or could be positioned on the launcher device 12 itself. The lateral bladder tube 36 is contained partially within the launcher device cavity 48 as shown in an inverted manner. The repair apparatus 60 remains outside the main bladder tube 34 on the exterior of the launcher device 12 and/or main bladder tube 34.

Air pressure is introduced in the cavity 48 through air hose 32, inflating the main bladder tube 34 to press the collar portion 68 of the repair apparatus 60 into contact with the interior wall of the main pipe line 50. Continuous air pressure causes the lateral bladder tube 36 to evert outwardly through the launcher device opening 46 into the lateral pipe line 52 from the position shown in FIG. 4 to the position shown in FIG. 5. While air is the preferred pressurized material, other gasses or fluids may be used. Pressure within cavity 48 is maintained until the repair apparatus is cured, thus mechanically or chemically fixing the repair apparatus 60 to the main and lateral pipes 50, 52 at the junction 54.

While the preferred embodiment of the invention is intended for use with an inversion-type application wherein the lateral bladder tube 36 inverts outwardly into the lateral pipe line 52, those skilled in the art will appreciate that the repair apparatus 60 can also be used in pull-in-place or push-in-place applications. In a pull-in-place application, the repair apparatus 60 can be pulled through the main pipe line 50 and to a position adjacent the opening to the lateral pipe line 52. The pull-in-place method is further described in U.S. Pat. No. 6,105,619, which is hereby incorporated in its entirety.

As noted, a push-in-place method could also be used to position the bladders and/or repair apparatus in the pipe or pipes. A push-in-place process includes the lateral bladder 36 being bent or otherwise positioned over the crown of the main pipe 50 until the assembly is aligned with the opening of the lateral pipe 52. At this point, the resilient lateral bladder 36 is allowed to revert to its original shape by popping or springing into the lateral pipe 52. The bladders 50, 52 can then be inflated to press the repair apparatus 60 against the main and lateral pipes.

Figure 6:
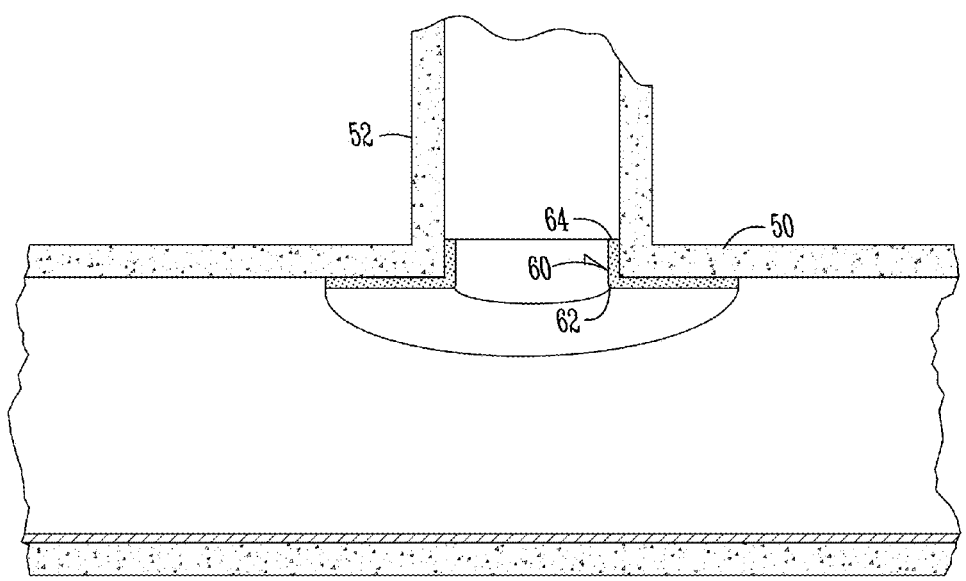
FIG. 6 is a sectional view showing the repair apparatus installed at the junction between a lateral pipe and a main pipe.

FIG. 6 shows the repair apparatus 60 top hat shape formed into the main pipeline 50 and lateral pipeline 52 junction 54. The repair apparatus 60 will now prevent any ground water flowing along the outer surface of main pipe 50 from penetrating into the interior of main pipe 50.

The invention has been shown and described above with the preferred embodiments, and it is understood that many modifications, substitutions, and additions may be made which are within the intended spirit and scope of the invention. For example, as noted, the main and lateral bladders can be fluidly connected such that one fluid source inflates both of the bladders, or separate fluid sources can be used. When a single fluid source is used, the bladders can be inflated substantially simultaneously, or can be allowed to inflate at different times by controlling the elasticity or other properties of the bladder portions. When separate fluid sources are used, it is contemplated that either of the bladder portions can be inflated prior to the other, and the present invention is not limited to the inflation order of the bladder portions. From the foregoing, it can be seen that the present invention accomplishes at least all of its stated objectives.

What is claimed is:

1. A system for repairing a junction between a main sewer pipe and a lateral sewer pipe, the system comprising an apparatus for repairing the junction between the main sewer pipe and the lateral sewer pipe, the apparatus comprising:
   a tubular portion having an opposite first and second ends, said tubular portion in contact with an interior wall of the lateral sewer pipe;
   a collar extending outwardly from one of the first or second ends of the tubular portion, said collar in contact with an interior wall of the main sewer pipe; and
   wherein the tubular portion and the collar are formed of a curable, waterproof putty;
   the system further comprising a bladder system which inverts the tubular portion of the repairing apparatus from the tubular portion facing downwardly from the collar towards the main sewer pipe, to facing upwardly from the collar toward the lateral sewer pipe.

2. The apparatus of claim 1 wherein the putty is an epoxy putty.

3. The apparatus of claim 1 wherein the putty is soft, malleable, and flexible.

4. The apparatus of claim 1 wherein the putty is a silicate putty.

5. The apparatus of claim 1 wherein the putty comprises a thermoset resin.

6. The apparatus of claim 5 wherein the putty is cured at ambient temperatures.

7. The apparatus of claim 1 wherein the putty includes abrasive materials.

8. The apparatus of claim 7 wherein the abrasive materials include stones or metal shavings.

9. The apparatus of claim 1 wherein the collar has a circular shape.

10. A method of repairing a junction between a main sewer pipe and a lateral sewer pipe that obviates the need for a resin-impregnated liner, the method comprising:
    forming a repair apparatus from a curable, waterproof putty, the repair apparatus including a tubular portion having opposite first end and second end and a collar extending outwardly from the first end of the tubular portion;
    providing a main bladder and a lateral bladder;
    positioning the collar of the repair apparatus at least partially on the outside of the main bladder;
    positioning the second end of the tubular portion of the repair apparatus at least partially on the inside of the lateral bladder;
    moving the repair apparatus, the main bladder and the lateral bladder along the main sewer pipe to an operative position with the tubular portion aligned with the junction between the main sewer pipe and the lateral sewer pipe;
    inflating the main bladder to press the collar against the main sewer pipe;
    inverting the lateral bladder with the tubular portion into the lateral sewer pipe to press the tubular portion against the lateral sewer pipe;
    removing the main bladder and the lateral bladder; and allowing the repair apparatus to cure to a rigid state.

11. The method of claim 10 wherein the main bladder and the lateral bladder are fluidly connected.

12. The method of claim 10 wherein the repair apparatus further comprises a thermoset resin.

13. The method of claim 12 further comprising allowing the thermoset resin in the repair apparatus to cure before removing the main bladder and the lateral bladder.

14. The method of claim 10 further comprising maintaining inflation in the main bladder and the lateral bladder until the repair apparatus has adhered to the main pipe.

15. The method of claim 10 wherein the putty comprises an epoxy putty.

16. The method of claim 10 wherein the putty comprises a silicate putty.

* * * * *